(12) United States Patent
Trksak et al.

(10) Patent No.: US 7,422,638 B2
(45) Date of Patent: Sep. 9, 2008

(54) SAGO-BASED GELLING STARCHES

(75) Inventors: Ralph M. Trksak, Manville, NJ (US); Patrick J. Ford, Middlesex, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 829 days.

(21) Appl. No.: 10/651,670

(22) Filed: Aug. 29, 2003

(65) Prior Publication Data
US 2005/0048190 A1 Mar. 3, 2005

(51) Int. Cl.
*C08B 30/00* (2006.01)

(52) U.S. Cl. .......................... 127/32; 426/578; 426/661; 426/573; 127/65; 127/71

(58) Field of Classification Search ................. 426/549, 426/573
See application file for complete search history.

(56) References Cited

U.S. PATENT DOCUMENTS

| | | | | |
|---|---|---|---|---|
| 2,328,537 A | 9/1943 | Felton et al. | ................... | 127/33 |
| 2,801,242 A | 7/1957 | Kerr et al. | ................. | 260/233.5 |
| 3,583,874 A | 6/1971 | Germino et al. | ................ | 99/139 |
| 4,207,355 A | 6/1980 | Chiu et al. | ................... | 426/578 |
| 4,228,199 A | 10/1980 | Chiu et al. | ................... | 426/578 |
| 4,229,489 A | 10/1980 | Chiu et al. | ................... | 426/578 |
| 4,391,836 A | 7/1983 | Chiu | ........................... | 426/578 |
| 4,477,480 A | 10/1984 | Seidel et al. | ................. | 426/578 |
| 5,187,272 A | 2/1993 | Katcher et al. | .............. | 536/102 |
| 5,833,755 A | 11/1998 | Schlom et al. | ................. | 127/32 |
| 6,447,616 B1 | 9/2002 | Cote et al. | ..................... | 127/32 |
| 2002/0102344 A1 * | 8/2002 | Hanchett et al. | ............ | 426/578 |

FOREIGN PATENT DOCUMENTS

EP 1 076 067 2/2001

OTHER PUBLICATIONS

Fennema, Owen R. (ed), Food Chemistry Third Edition, Mercel Dekker, Inc. 1996. pp. 201-204.*
Saowakon Wattanachant: "Suitability of Sago Starch as a base for dual—modification" Songklanakarin J. Sci Technol., vol. 24, No. 3, Jul. 2002, pp. 431-438.

* cited by examiner

*Primary Examiner*—Lien Tran
*Assistant Examiner*—Kelly Mahafkey
(74) *Attorney, Agent, or Firm*—Karen G. Kaiser

(57) ABSTRACT

Sago-based gelling starches and the use thereof. Such modified starches exhibit exceptionally fast gelling properties, high gel strengths, and exceptional elasticity. These properties allow for significantly reduced processing times, including reduced hold times. Further, the higher gel strength allows for reduced starch levels without loss of final product gel strength integrity or texture. The instant gelling starches are particularly useful in food systems of the type that gel upon standing, such as pie and cream fillings, puddings, spreads, and jellies.

23 Claims, 7 Drawing Sheets

Effect of Cross-linking on Peak Viscosity

Top Five Performing Samples vs Controls
Acid Conditions (pH = 3.1) Room Temperature

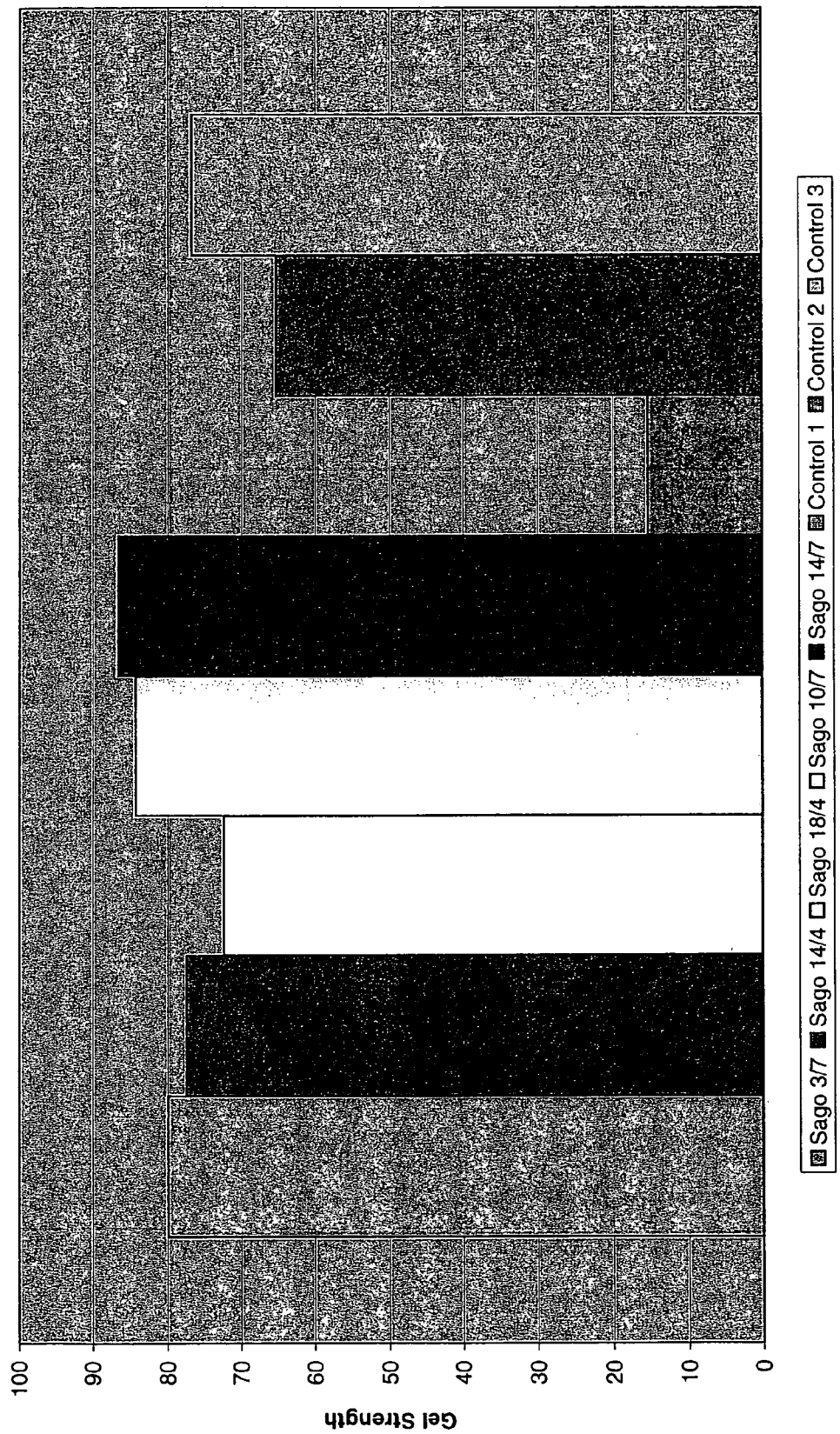

SAGO-BASED GELLING STARCHES

BACKGROUND OF THE INVENTION

1. Technical Field

The present invention relates to a pregelatinized or cold water dispersible, modified starch and the process for its preparation. More specifically, the present invention is directed towards a modified sago-based starch having improved gelling properties wherein the starch gels 'instantaneously' or fast relative to other gelling starches.

2. Background Information

Food systems such as pie fillings, puddings and jellies have a set or gel texture when prepared. These types of food systems typically contain gelling agents and must be cooked to effect gelation. Common gelling agents used for this purpose include agar, gelatin, cornstarch, pectin, carrageenin, algin, and combinations of locust bean gum and xanthan gum. It is known that starch can be used to add texture to products by means of its gelling properties. For example, acid converted starch derivatives that are converted to a certain water fluidity level will retrograde to a gel when cooked. These include, for example, derivatives of corn, potato, tapioca and wheat.

Conventional starch-based puddings are exemplary of food products that require cooking to effect gelation. These puddings generally include an ungelatinized starch, flavorings, sweetening agents, etc., and are prepared for consumption by adding milk, cooking until the starch is gelatinized, pouring the cooked mixture into a bowl or individual serving dish, and cooling and/or refrigerating.

However, these types of food systems are disadvantageous not only because of the cooking required to impart the gel texture thereto, but also due to other requirements of the food system. For example, gelatin can be used only after dissolution in very hot water, and typical pectins used in jellies require about 65% sugar solids to produce a gel.

There are other known food systems having a set or gel texture that form a gel without cooking. Many of these products are dairy based and include pregelatinized (i.e., cold water dispersible) starch and one or more setting agents that are usually phosphate salts (e.g., tetrasodium pyrophosphate), as well as flavoring, sweetening and coloring agents. The set or gel properties of these food systems are due to the interaction between the phosphate salts and the casein and calcium ion provided by the milk, and not with the starch ingredients in the formulation. Here, the pregelatinized starch functions as a viscosity builder or thickening agent. However, it is not the prime factor in the development of the gel structure of the prepared food system.

These uncooked, so-called 'instant' food formulations typically do not have the firm gel structure of the cooked formulations. For instance, they do not cut as cleanly with a spoon. Further, their texture, rather than being smooth, can be characterized as 'grainy' in both appearance and 'mouth-feel'. Also, the setting salt agents are not operative at low pH or in non-dairy based food systems.

Non-dairy based food systems having a set or gel texture that form a gel without cooking are also known. U.S. Pat. No. 4,207,355 teaches a cold-water dispersible, modified tapioca starch that forms a gel when dispersed in cold water. The starch product is obtained by drum drying a tapioca starch that has been converted to specified water fluidity and reacted with a crosslinking agent to give Brabender viscosity parameters within a selected range. The patent teaches that simply crosslinking the starch and drum drying it without converting it to fluidity starch does not result in a product having gelling properties.

The reverse process of U.S. Pat. No. 4,207,355, i.e., crosslinking native tapioca starch, then converting the starch to its fluidity form, and lastly drum drying it, is disclosed in U.S. Pat. No. 4,229,489.

U.S. Pat. No. 4,228,199 teaches a cold-water dispersible, modified potato starch that forms a gel when dispersed in cold water. The starch product is obtained by drum drying a potato starch that has been reacted with a crosslinking agent to give Brabender viscosity parameters within a selected range. The step of converting the starch to specified water fluidity required in U.S. Pat. Nos. 4,207,355 and 4,229,489 is not required in the '199 patent. However, if desired, the potato starch can be converted to specified water fluidity either before or after the crosslinking step.

U.S. Pat. No. 4,391,836 discloses instant gelling native tapioca or native potato starches that are made cold water dispersible by drum drying the native starch, and then heat treating the drum dried starch to reduce its viscosity to within specified limits. Lightly converted tapioca or potato starches can be used in place of the native starches.

Typically, gum confections use a fluidity starch or a combination of a high amylose starch and a fluidity starch which are cooked at a moisture content above the final moisture content of the confectionery, and deposited as a thin, hot liquid into a mold generally formed of dry starch. The starch in the mold forms the confectionery pieces and serves to reduce the moisture content of the confectionery to the level of the end product. This starch mold casting process has the disadvantage of long processing time in order to obtain gel strength integrity sufficient for handling and packaging as well as a desirable product texture.

U.S. Pat. No. 6,447,615 teaches converted sago fluidity (i.e., viscous) starches having a water fluidity of from about 40 to about 80. The sago fluidity starches form exceptionally strong gels and have a faster gelling rate than fluidity starches derived from other plants. However, the sago fluidity starch gels tend to have weaker gel strength at lower solids and are subject to syneresis. While such a starch can be useful in confectioneries, it is undesirable in food formulations such as pie and cream fillings, puddings, spreads and imitation jellies.

Accordingly, there is a need for an instant gelling starch that forms strong gels more rapidly than presently available instant gelling starches. Further, there is a need for an instant gelling starch that has a smooth texture and lack of graininess often found in cold water dispersible starches.

SUMMARY OF THE INVENTION

The present invention is directed to modified sago-based starches and their uses. Such starches exhibit exceptionally fast gelling properties, high gel strengths, smooth texture in both appearance and mouth-feel, and are cuttable. These properties allow for significantly reduced processing times, including reduced hold times. Further, the higher gel strength allows for reduced starch levels without loss of final product gel strength integrity or texture.

These properties are achieved by a cold-water dispersible, modified sago starch having gelling properties. The modified sago starch is prepared by physically modifying a sago starch that has been converted to a viscosity of about 400 to about 850 Brabender Units and inhibited. This converted, inhibited modified starch is capable of forming a gel having a gel strength of at least 20 grams/force within five hours of preparation at room temperature and under acidic conditions. Once gelled, the dispersion retains its shape when cut.

The present modified starch is useful in any food formulation where it is desired that the starch gel without further cooking. The present starch is particularly suited for use in pie and cream fillings, puddings, spreads, jellies, and instant mixes that are reconstituted with water or milk and allowed to set at room temperature. A food system containing the starch of the present invention will have properties such as texture, appearance, gel structure and flavor that closely resemble those of a cooked food formulation.

The present invention is further directed towards a cold water dispersible, modified sago starch with gelling properties. The modified sago starch is prepared by pregelatinizing a sago starch that has been converted to a viscosity of about 400 Brabender Units to about 1000 Brabender Units and inhibited. This converted, inhibited starch preferably has a Brabender Viscosity Differential ("BVD"), measured between about 80° and about 90° C., of from about −35 BVD to about 25 BVD.

The present invention is further directed towards a sago starch having a viscosity of from about 400 Brabender Units ("BU") to about 850 Brabender Units and having a gel strength at least 100% greater than a comparable cornstarch having a viscosity of from about 400 BU to about 1000 BU when both the sago starch and the cornstarch are evaluated for gel strength at a 10% solids content.

The present invention also provides a process for preparing a cold water dispersible, modified sago starch having gelling properties. This process includes converting a sago starch to a viscosity of about 400 Brabender Units ("BU") to about 1000 BU; inhibiting the sago starch such that the crosslinked starch has a Brabender Viscosity Differential ("BVD"), measured between about 80° and about 90° C., of from about −35 BVD to about 25 BVD, measured at 7% solids; and pregelatinizing the sago starch. This converted, inhibited, pregelatinized sago starch is capable of forming a gel having a Bloom strength of at least 30 grams within 5 hours from preparation. The process can include the additional step of bleaching the starch.

BRIEF DESCRIPTION OF THE DRAWINGS

The manner in which these objectives and other desirable characteristics can be obtained is explained in the following description and attached drawings in which:

FIG. 7 is a graph illustrating the gel strength of various sago-based gels according to the present invention as compared to refrigerated non-sago based controls

DETAILED DESCRIPTION OF THE INVENTION

Figure 1:
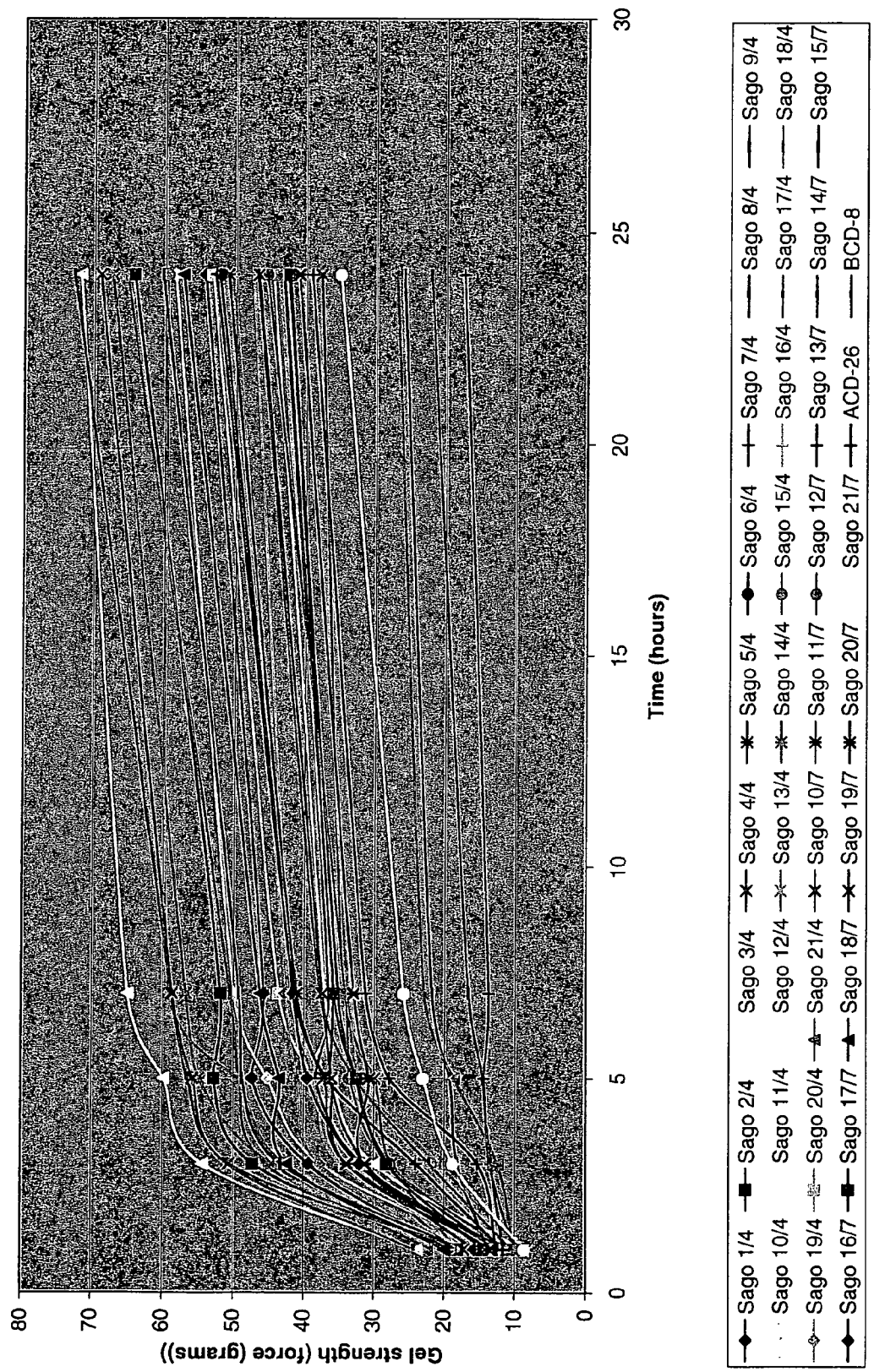
FIG. 1 is a graph illustrating the gel strength of various sago-based gels according to the present invention in lemon pie over time.

The starch base material used for the present invention is native sago starch extracted from the pith of the sago palm tree. This includes high amylose varieties wherein at least 40% of the starch is amylose. The granular starch has been converted to a viscosity of about 400 to about 850 Brabender Units. The starch is converted to its viscosity or thin-boiling form using a suitable method of degradation that results in the modified starch defined herein. Such degradation includes, for example, mild acid hydrolysis with an acid such as sulfuric or hydrochloric acid, conversion with hydrogen peroxide, or enzyme conversion. Converted sago products can include blends of sago starch converted by various techniques as well as converted sago starch blended with unconverted sago starch.

Commercially, starch is typically converted by acid or enzyme conversion techniques. In preparing starches converted by acid treatment, the granular starch base is hydrolyzed to the required viscosity in the presence of an acid. This is done at a temperature below the gelatinization point of the starch. The starch is slurried in water, followed by addition of the acid, which is usually in concentrated form. Typically, the reaction takes place over an 8 to 16 hour period, after which the slurry is pH adjusted to a pH of about 5.5. The starch can then be recovered by filtration.

In converting starch by enzyme treatment, the granular starch base is slurried in water and pH adjusted from about 5.6 to about 5.7. A small amount of an enzyme such as α-amylase (e.g., about 0.02% on the starch) is added to the slurry. The slurry is then heated above the gelatinization point of the starch. When the desired conversion is reached, the slurry is pH adjusted, e.g., with acid, to deactivate the enzyme. The dispersion is held at the pH necessary to deactivate the enzyme for a period of at least 10 minutes. Thereafter the pH may be readjusted. The resulting enzyme converted starch can be jet-cooked to ensure complete solubilization of the starch and deactivation of the residual enzyme. The type and concentration of the enzyme, the conversion conditions, and the length of conversion contribute to the composition of the resultant product. Other enzymes or combination of enzymes can be used.

Hydrogen peroxide can also be used to convert or thin the starch, either alone or with metal catalysts. For example, U.S. Pat. No. 3,655,644 discloses a method of thinning derivatized starch using hydrogen peroxide and a copper ion catalyst. U.S. Pat. No. 3,975,206 discloses a method for thinning starch employing hydrogen peroxide in combination with heavy metal salt catalysts such as iron, cobalt, copper or chromium at an acid pH. This patent further list a number of references directed to degrading or thinning starch with hydrogen peroxide under a variety of conditions. U.S. Pat. No. 4,838,944 discloses a process for the degradation of granular starch using hydrogen peroxide and a catalytic amount of manganese salt, preferably potassium permanganate, in aqueous slurry at a pH of 11.0 to 12.5 (a 'manox' conversion). Even more recently, U.S. Pat. No. 5,833,755 disclosed a process for degrading granular starch with hydrogen peroxide. The process is performed at a temperature below the gelatinization temperature of the starch. The steps include providing aqueous slurry of granular starch at a pH of 11.0 to 12.5, adding an effective catalytic amount of a metal complex catalyst to the aqueous slurry, and adding the hydrogen peroxide to the aqueous slurry in an effective amount to degrade the granular starch. In a preferred embodiment, the sago starch is converted with hydrogen peroxide.

Sago starch of the present invention is converted to a viscosity of from about 400 to about 850 Brabender Units ("BU"). It is recognized that viscosity is the resistance that a material has to change in form, with that material increasing in resistance as it increases in viscosity. Viscosity of native and modified starches is measured during controlled heating and cooling. Starch viscosity is typically given in terms of Brabender Units, which can be measured using a viscograph (such as a Visco-Amylo-Graph® commercially available from C. W. Brabender Instruments, Inc., South Hackensack, N.J.). A standardization kit can be used for calibrating, which can include a 350 and/or 700 cmg cartridge, a bowl rotational speed of 75 rpm and a starting temperature of 50° C. Subsequent rate of temperature increase and decrease during viscosity determination is 1.5° C./min. Accurate and reproducible measurements of viscosity are obtained by determining the torque data from the amylogram, based on the concentration and quantity of the starch slurry at various predetermined temperatures. Gel temperature is the temperature at which the viscosity has increased by 20 BU. Peak temperature is the temperature at which the viscosity reaches peak value. Peak viscosity is the BU at the peak temperature.

The base material can be modified chemically and/or physically using techniques known in the art. The modification can be to the base or the converted sago starch, though typically the modification is carried out after conversion.

Chemically modified starches include, without limitation, crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications are known in the art, for example, in MODIFIED STARCHES: PROPERTIES AND USES, Chpt. 3-10, pp. 41-147, Ed. Wurzburg, CRC Press, Inc., Florida (1986).

Physically modified starches, such as thermally inhibited starches described in International Publication WO 95/04082, may also be suitable for use herein. Physically modified starches are also intended to include fractionated starches in which there is a higher proportion of amylose.

Preferably the modified starch is a crosslinked starch. In modifying the starch, it is reacted with any crosslinking agent capable of forming linkages between the starch molecules. Typically crosslinking agents suitable herein are those approved for use in foods, such as epichlorohydrin, linear dicarboxylic acid anhydrides, acrolein, phosphorus oxychloride, and soluble metaphosphates. Other known crosslinking agents such as formaldehyde, cyanuric chloride, diisocyanates, divinyl sulfone, and the like may also be used if the product is not to be used in food. Preferred crosslinking agents are phosphorus oxychloride, epichlorohydrin, sodium trimetaphosphate (STMP), and adipic-acetic anhydride, and most preferably phosphorus oxychloride.

The crosslinking reaction itself is carried out according to standard procedures described in the literature for preparing crosslinked, granular starches. Examples of such art include U.S. Pat. Nos. 2,328,537 and 2,801,242. Of course, the exact reaction conditions employed will vary with the type of crosslinking agent used, as well as the type of starch base, the reaction scale, etc. The reaction between the starch and the crosslinking agent can be carried out in an aqueous medium. In this preferred method, the starch is slurried in water and adjusted to the proper pH, followed by addition of the crosslinking agent.

The crosslinking reaction is generally carried out at a temperature of about 5° to about 60° C., and preferably at about 20° to about 45° C. Use of temperatures above about 60° C. is undesirable, since granule swelling and filtration difficulties or gelatinization of the starch can result therefrom. Further, it is desirable that the starch retains granular form until it is pregelatinized. Reaction time will vary depending on the crosslinking agent and temperature used, and is typically about 0.2 to about 16 hours.

After completion of the crosslinking reaction, the reaction mixture is pH adjusted to between about 5 and about 6.5 using a common acid or base as necessary. The granular product can be recovered by filtration and washed and dried prior to pregelatinization. However, this washing step is not necessary for purposes herein, and the crosslinked product can be pregelatinized directly without isolation thereof.

The amount of crosslinking agent necessary to give a product having the characteristics defined herein will vary depending on, for example, the degree of conversion of the starch, the type of pregelatinization employed, the type of crosslinking agent used, the concentration of the crosslinking agent, the reaction conditions, and the necessity for having a crosslinked starch that falls within a specified range of crosslinking as determined by its viscosity characteristics. One skilled in the art will recognize that it is not the amount of crosslinking agent added to the reaction vessel that determines the properties of the final product, but rather the amount of reagent that actually reacts with the starch, as measure by the Brabender viscosities. Still, the amount of crosslinking agent used for reaction will generally vary from about 0.01% to about 0.07% by weight, depending on the water fluidity of the starch. The exact range can also depend on the pregelatinization process. The type of crosslinking agent used can result in a larger or smaller amount employed. However, in all cases the amount of crosslinking agent must be at least 0.005% by weight.

Since the starch can have various degrees of conversion as measured by its Brabender viscosity, each conversion level will yield a different viscosity with the same amount of crosslinking. Thus, the specific Brabender viscosity values required in order to produce a modified starch that forms a gel under the conditions prescribed herein are highly dependent on the degree of conversion. It is therefore not possible to set Brabender parameters that will be applicable to all starches within the required 400 to 850 Brabender Unit range. The best correlation between Brabender viscosity and gel strength which results in a starch having the specified minimum gel strength is made by expressing the required amount of crosslinking in terms of the parameter defined below, called the Brabender Viscosity Differential ("BVD") for purposes herein:

$$\left[\frac{V_{95} - V_{80}}{V_{80}}\right] \times 100$$

wherein $V_{95}$ and $V_{80}$ are the Brabender viscosities of the starch at 95° and 80° C., respectively. The BVD, which is expressed in percentage units, may be a positive or negative value, depending on whether the Brabender curve continues to rise (a positive BVD, indicating a higher level of inhibition), or goes through a peak and drops (a negative BVD, indicating a lower level of inhibition). For the Brabender Unit range of about 400 to about 850, the Brabender Viscosity Differential of the converted, crosslinked starch may vary broadly from about −40 to about +30%, measured at 7% solids using a 350 cm-g cartridge. A practitioner will understand that not all of the values within the above-mentioned BVD range will be operable for starches having values within the given Brabender Unit range. The appropriate BVD must be separately determined for each Brabender Unit and for the pregelatinization process employed, as will be described herein below.

Any starch or starch blends having suitable properties for use herein may be purified, either before or after any modification or conversion, by any method known in the art to remove starch off flavors, odors, or colors that are native to the starch or created during processing. Suitable purification processes for treating starches are disclosed in the family of patents represented by European Patent No. 554 818. Alkali washing techniques are also useful and described in the family of patents represented by U.S. Pat. Nos. 4,477,480 and 5,187,272. Preferably, the starch is alkali washed with an alkaline earth-metal hydroxide such as sodium hydroxide. Further, this washing preferably occurs before conversion and/or crosslinking of the starch.

The crosslinked, converted sago starch obtained by the steps outlined above must be pregelatinized to become cold-water dispersible. Various techniques known in the art, including drum drying, spray drying, extrusion or jet cooking can pregelatinize these starches. Exemplary processes for preparing pregelatinized starches are disclosed in U.S. Pat. Nos. 1,516,512; 1,901,109; 2,314,459; 2,582,198; 2,805,966; 2,919,214; 2,940,876; 3,086,890; 3,133,836; 3,137,592; 3,234,046; 3,607,394; 3,630,775; 4,280,851; 4,465,702; 5,037,929; 5,131,953, and 5,149,799.

Preferably, the pregelatinization is accomplished herein by using a suitable drum dryer having a single drum or double drums that dries the starch to a moisture level of about 12% or less. The starch slurry is typically fed onto the drum or drums through a perforated pipe or oscillating arm from a tank or vat provided with an agitator and a rotor.

The viscosity and crosslinking levels specified above are interdependent, but they also vary to some degree with the drum dryer employed. It has been found that pregelatinization techniques that produce higher shear require that the starch have a higher level of crosslinking to obtain the present modified starch with its gelling properties. While not being limited to any one theory, it is postulated that the unique gelling properties of the products herein are related to the release of amylose during pregelatinization. The conversion of the starch alters the starch granule to control the size of the amylose released and to control the amount of amylose released; and the crosslinking, also a factor in amylose release, increases resistance of the granules to shearing breakdown during pregelatinization. Thus, pregelatinization techniques with higher shear possibly tend to disrupt the granules to a greater extent, liberating more amylose at a faster rate. This released amylose is deposited on the surface of the swollen granules during pregelatinization (such as during drum-drying) so that it can readily redisperse when added to water. If, however, the starch is more highly crosslinked, it will resist this disruption and can be successfully pregelatinized using higher-shear apparatus without an adverse effect on its gelling properties.

After pregelatinization, the starch product is removed from the apparatus and then pulverized to a powder. Alternatively, the product may be reduced to flake form, depending on the particular end-use, although the powdered form is preferred. Any conventional equipment such as a Fitz mill, grinder or hammer mill may be used to effect suitable flaking or pulverizing.

The final product obtained from the pregelatinization operation is a cold-water dispersible starch that forms a gel when dispersed in an aqueous solution such as water or dairy. The determination of gel formation and the measurement of gel strength are accomplished by subjective evaluation and by texture analyzer readings. These two methods of measurement are not always consistent (due in part to the cohesiveness of some of the products), but for purposes herein, the present modified starch must form a gel having a gel strength (as defined herein) of at least about 20 grams, preferably at least about 30 grams, and most preferably at least about 45 grams within five hours of preparation. Preferably, the modified sago starch of the present invention forms a gel in a food system when provided in an amount of about 6% solids content.

Figure 6:
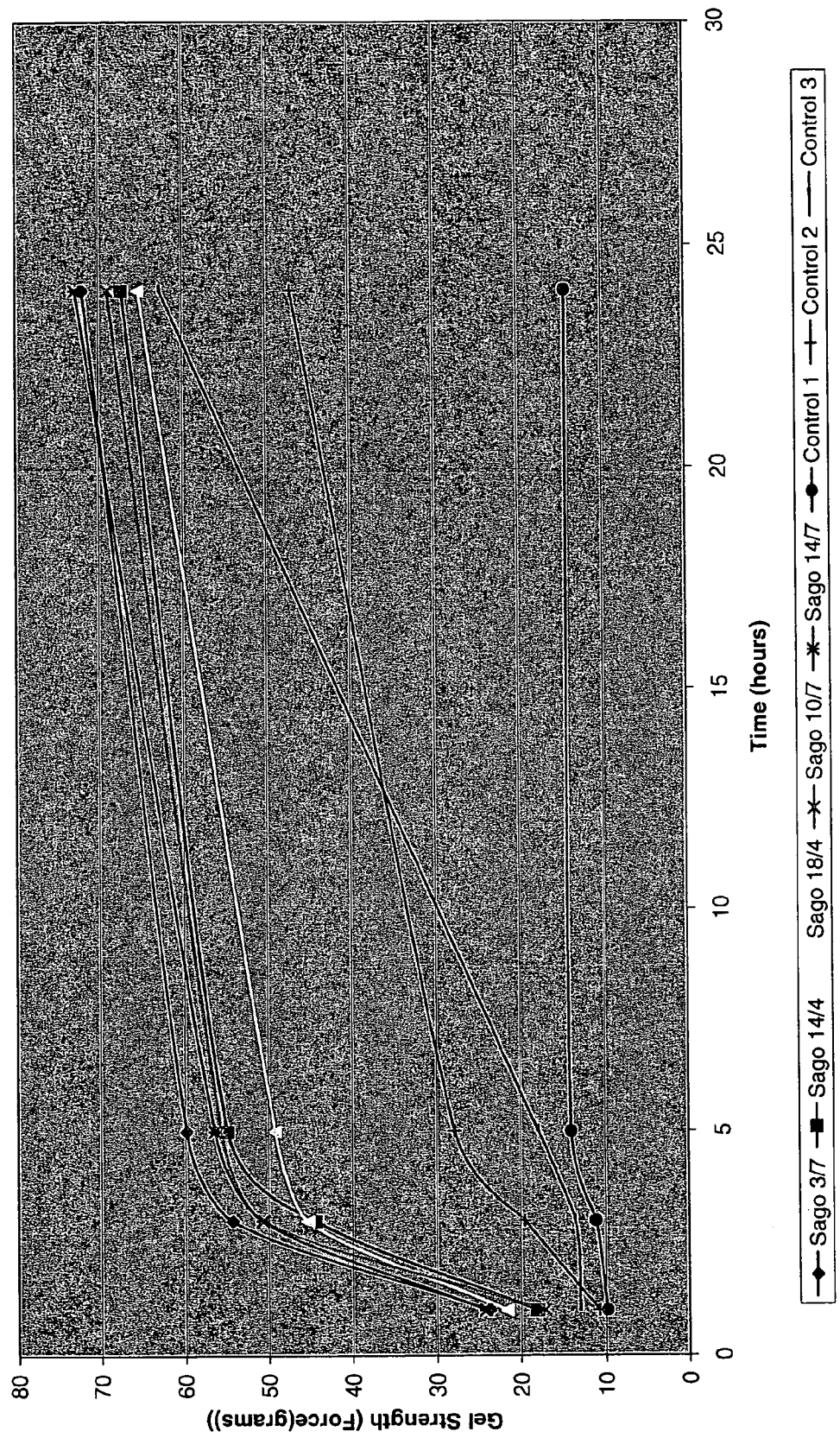
FIG. 6 is a graph illustrating the gel strength of various sago-based gels according to the present invention as compared to non-sago based controls.

The resultant modified sago starch has a faster gelation rate than comparable starches prepared from other bases such as corn. As illustrated in FIG. 6, the resultant modified sago starch forms gels faster, typically about 100% faster, more particularly 300% faster, than comparable starches prepared from other bases such as corn. This increased gel rate may allow reduced starch levels in products while still achieving the desired gel strength and texture. For example, to provide comparable gel strength and texture, generally at least 30% more, particularly at least 50% more, more particularly at least 100% more of a comparable cornstarch would need to be used.

The modified sago starch gels tend to be cuttable in nature, as opposed to elastic. This cuttable nature is desirable in many end use applications, such as in pie fillings where the cuttability provides form and smoothness The resultant modified sago starches generally have good water holding properties in that syneresis is limited. The starches are generally comparable to or better than modified tapioca starches with respect to low pH, shear, and temperature tolerance. For example, in conditions most unfavorable to gelling (here, at room temperature in an acid system having a pH of 3.1), the modified sago starches of the present invention form stronger gels more rapidly than other modified starches such as modified tapioca starches.

Modified sago starches may also be used to replace gelatin, casein, pectin, agar, gum arabic, isolated soy or meat proteins, and certain gelling gums such as carageenan.

The resultant sago fluidity starches are useful in a variety of industrial applications including food products, personal care products, pharmaceuticals and nutraceuticals, paper-making, agricultural products, and paints, particularly in those applications where low-viscosity starches are needed to provide a high-solids starch dispersion with a pumpable and workable viscosity. Industrial applications in which degraded or converted starches are particularly desirable or required include paper and paperboard manufacture, the manufacture of gypsum board for dry wall construction, and textile warp sizing.

Food products refer to both foods and beverages. This includes, but is not limited to, confectioneries such as starch gum candies, noodles, puddings, custards, and flan, fillings such as pie fillings, imitation cheese and cheese products, spreads such as margarine, toppings, icings, imitation fish, poultry or meat, starch balls, yogurts, gelled desserts, jellies, and egg products.

The modified sago starch may be used in any amount necessary to achieve the characteristics desired for the particular end use application. In general, the starch is used in an amount of at least about 4%, particularly at least about 6%, more particularly at least about 7%, by weight of the product.

In the examples which follow, all parts and percentages are given by weight and all temperatures in degrees Centigrade (° C.) unless otherwise indicated. The following examples are presented to further illustrate and explain the present invention and should not be taken as limiting in any regard. All percents used are on a weight/weight basis. The following analytical and testing procedures were used throughout the examples to characterize the starch products herein:

A. Gel Strength Measurement Using a Texture Analyzer

Gel strength was measured using a texture analyzer model TA-XT2 (commercially available from Stable Micro Systems, Surrey, United Kingdom). Twenty grams of anhydrous starch were mixed with deionized water to obtain the desired percent solids starch slurry. The slurry was cooked in a boiling water bath for twenty minutes with stirring to keep the starch suspended until thickened, and then covered without stirring. Gel strength analysis was performed on gel formed from the starch sample in a 4-oz (118-ml) jar at room temperature and a pH of 7. The jar is centered below a 5-mm probe and the test run using the following parameters:
  Mode: Force/Compression
  Option: Return to start
  Pre-speed: 5.0 mm/sec
  Speed: 0.5 mm/sec
  Post-speed: 5.0 mm/sec
  Force: N/A
  Distance: 15.0 mm
  Time: N/A
  Count: N/A
  Trigger: 0.05N
  PPS: 200.00
  Probe: P50 12.7 mm (½ in) diameter, Plastic Cylinder B. Measurement of Viscosity by Brabender Evaluation Viscosity is measured using a Micro Visco-Amylo-Graph® (available from C. W. Brabender® Instruments, Inc., South Hackensack, N.J.). 35.4 g (anhydrous basis) of converted, crosslinked starch is slurried in enough distilled water to bring the total weight to 500 g and then added to the Brabender® Visco-Amylo-Graph® bowl. The starch slurry is rapidly heated to 50° C. and then heated further from 50° to 95° C. at a heating rate of 1.5° C. per minute. The viscosity readings are recorded at 80° C., 95° C., and again at 95° C. after a 20-minute hold at 95° C. ('95° C.+20').

C. Lemon Pie Filling Gel Evaluation

A total of 6.0 g of converted, cross-linked pregelatinized starch, 24.6 g sugar, 0.62 g dextrose, 0.19 g sodium citrate and 0.19 g citric acid are dry-mixed by shaking in a 4-oz. (118-ml) jar. This dry mixture is slowly added to a solution of 55.5 g distilled water and 12.91 g lemon juice over the course of one minute and mixed in a Sunbeam® Mixmaster® Kitchen Master at speed #1 for a period of 4 minutes.

The resulting mixture is then poured into 4-oz (118-ml) jars, allowing for a headspace of approximately 5 mm and placed in a refrigerator at 15° C. for 7 hours. Alternatively, the mixture is held at room temperature for various periods of time.

EXAMPLE I

This example illustrates a procedure for bleaching and converting sago starch to a required Brabender viscosity, then crosslinking the starch with phosphorus oxychloride.

A slurry was prepared by suspending 2000 g of sago starch in 3000 ml of tap water. The temperature of this slurry was adjusted to 45° C. in a hot water bath. Hydrochloric acid was used to adjust the pH to 2.5 and 5 g of sodium chlorite was added. After holding for two hours, the pH of the slurry was adjusted to 4.0. Sufficient sodium metabisulfite was added to neutralize any remaining oxidant.

The temperature was allowed to drop to 42° C. The alkalinity was then raised to between 28 and 32 ml 0.1IN HCl (50-ml sample) by slowly adding a 3% aqueous NaOH solution. To this mixture, 5.0 g of a 2% aqueous solution of potassium permanganate was added (i.e., 0.005% based on weight of starch, corresponding to 17.5 ppm of manganese ions based on the weight of starch). 2.0 g of 30% $H_2O_2$ is then added to the starch slurry. This reaction was held for three hours until no hydrogen peroxide remains, as indicated by a negative test on an $H_2O_2$ quant strip. The resulting starch was found to have a Brabender viscosity of 700 BU.

The temperature of the starch slurry was then lowered to 30° C. and 0.5% NaCl (10 g) and 0.020% $POCl_3$ (0.4 g) was added to the starch slurry and reacted for 0.5 hour in order to crosslink the starch. The pH of the starch slurry was then adjusted to 5.5 by addition of hydrochloric acid. The starch product was recovered by filtration, washed twice with water and air-dried.

EXAMPLE II

This example illustrates a method of preparation of a variety of bleached, converted sago starches (all bleached in the manner of Example 1) having a wide range of viscosities as well as being crosslinked with a wide range of $POCl_3$ treatment levels. As further examples will show, the Brabender of the optimum crosslinked sago base (prior to pregelatinization) will have a 95° C.+20 viscosity of 500 BU or higher and a BVD ('Brabender Viscosity Differential') of less than 5.

TABLE 1

| SAGO SAMPLE | % | % | INTERMEDIATE PEAK VISCOSITY | BRABENDER VISCOSITY ANALYSIS | | | | |
|---|---|---|---|---|---|---|---|---|
| No. | $H_2O_2$* | $POCl_3$ | Viscosity (BU) | Peak | 80° C. | 95° C. | 95° C. + 20' | BVD |
| 1 | 0.1 | 0.010 | 710 | 1000 | 980 | 780 | 700 | −20.408 |
| 2 | 0.1 | 0.015 | 710 | 950 | 940 | 790 | 700 | −15.957 |
| 3 | 0.1 | 0.020 | 710 | 930 | 925 | 800 | 720 | −13.514 |
| 4 | 0.2 | 0.010 | 550 | 605 | 585 | 430 | 345 | −26.496 |
| 5 | 0.2 | 0.015 | 550 | 590 | 575 | 450 | 375 | −21.739 |
| 6 | 0.2 | 0.020 | 550 | 435 | 430 | 380 | 350 | −11.627 |
| 7 | 0.3 | 0.010 | 430 | 450 | 440 | 300 | 225 | −31.82 |
| 8 | 0.3 | 0.015 | 430 | 470 | 460 | 340 | 265 | −26.087 |
| 9 | 0.3 | 0.020 | 430 | 420 | 420 | 340 | 290 | −19.048 |
| 10 | 0.07 | 0.025 | 825 | 625 | 605 | 625 | 645 | 3.306 |
| 11 | 0.07 | 0.030 | 825 | 390 | 340 | 390 | 440 | 14.706 |
| 12 | 0.07 | 0.035 | 825 | 360 | 305 | 360 | 410 | 18.033 |
| 13 | 0.07 | 0.040 | 825 | 240 | 200 | 240 | 295 | 20 |
| 14 | 0.1 | 0.025 | 710 | 610 | 605 | 580 | 560 | −4.132 |
| 15 | 0.1 | 0.030 | 710 | 480 | 480 | 480 | 495 | 0 |

TABLE 1-continued

| SAGO SAMPLE | % | % | INTERMEDIATE PEAK VISCOSITY | BRABENDER VISCOSITY ANALYSIS | | | | |
|---|---|---|---|---|---|---|---|---|
| No. | $H_2O_2$* | $POCl_3$ | Viscosity (BU) | Peak | 80° C. | 95° C. | 95° C. + 20' | BVD |
| 16 | 0.1 | 0.035 | 710 | 360 | 330 | 360 | 400 | 8.33 |
| 17 | 0.1 | 0.040 | 710 | 310 | 270 | 310 | 340 | 14.815 |
| 18 | 0.13 | 0.025 | 595 | 390 | 390 | 375 | 375 | −3.846 |
| 19 | 0.13 | 0.030 | 595 | 300 | 300 | 300 | 320 | 0 |
| 20 | 0.13 | 0.035 | 595 | 240 | 220 | 240 | 255 | 9.091 |
| 21 | 0.13 | 0.040 | 595 | 175 | 160 | 175 | 200 | 9.375 |

*$H_2O_2$ was added from a 30% solution.

The sago samples listed in the Tables are identified in the Figures based on their sample number and pH when drum dried. For example, sago sample 10 drum dried at a pH of 4 is shown in the legend as 'Sago 10/4'. FIG. 1 illustrates the gel strength of the above sago samples over time in an acidic environment (here, a lemon pie filling having a pH of 3.1).

EXAMPLE III

This example illustrates a method of pregelatinization by drum drying the above converted and crosslinked sago starches to obtain the instant gelling starches herein.

Each sample was drum-dried by slurrying 200 g starch in 300 ml water, then cooking and drying the slurry by slowly feeding it onto a steam-heated 10 inch diameter steel drum, with steam pressure of 105-110 psi. The starch was applied to the drum prior to a 2-inch diameter feed roller, with the drum operating at a speed of 5 RPM. The pregelatinized starch sheet was scraped off of the drum by a steel blade. The pregelatinized starch sheets obtained were then ground until 85% of the starch passed through a 200-mesh screen.

The gelling properties of the dried starch products were evaluated by the gel strength test described above in the 'Gel Strength Measurement' procedural section. The results are listed in Table 2 below. It can be seen that much weaker gels are obtained when the peroxide treatment is greater than about 0.13% and/or when the starch is crosslinked at levels above 0.030% POCl3.

TABLE 2

| SAGO SAMPLE | % | % | INTERMEDIATE BRABENDER VISCOSITY | SAMPLE GEL STRENGTH (GRAMS OF FORCE) | | | | | |
|---|---|---|---|---|---|---|---|---|---|
| No. | $H_2O_2$ | $POCl_3$ | Viscosity (BU) | 1 hour | 3 hours | 5 hours | 7 hours | 24 hours | 7 hr Ref. |
| 1 | 0.1 | 0.010 | 710 | 19.2 | 39.3 | 47.3 | 45.7 | 54.4 | 60.9 |
| 2 | 0.1 | 0.015 | 710 | 18.4 | 47.2 | 52.8 | 51.8 | 64.2 | 69.8 |
| 3 | 0.1 | 0.020 | 710 | 23.8 | 54.4 | 59.8 | 64.9 | 72.0 | 79.9 |
| 4 | 0.2 | 0.010 | 550 | 18.0 | 27.4 | 29.9 | 34.3 | 37.8 | 45.6 |
| 5 | 0.2 | 0.015 | 550 | 18.7 | 31.2 | 36.2 | 36.0 | 43.1 | 48.8 |
| 6 | 0.2 | 0.020 | 550 | 12.9 | 27.7 | 32.6 | 35.1 | 42.5 | 42.3 |
| 7 | 0.3 | 0.010 | 430 | 11.6 | 13.3 | 14.4 | 13.7 | 17.4 | 18.3 |
| 8 | 0.3 | 0.015 | 430 | 13.7 | 18.1 | 19.2 | 21.8 | 26.0 | 30.7 |
| 9 | 0.3 | 0.020 | 430 | 10.0 | 13.5 | 14.4 | 16.6 | 22.2 | 20.3 |
| 10 | 0.07 | 0.025 | 825 | 12.5 | 37.6 | 45.2 | 50.0 | 58.7 | 66.5 |
| 11 | 0.07 | 0.030 | 825 | 12.6 | 31.5 | 38.5 | 43.6 | 53.4 | 58.3 |
| 12 | 0.07 | 0.035 | 825 | 8.8 | 30.0 | 36.0 | 37.1 | 44.8 | 48.3 |
| 13 | 0.07 | 0.040 | 825 | 8.3 | 20.6 | 31.9 | 33.6 | 40.7 | 40.1 |
| 14 | 0.1 | 0.025 | 710 | 18.1 | 44.4 | 54.9 | 56.7 | 67.3 | 77.4 |
| 15 | 0.1 | 0.030 | 710 | 17.3 | 42.6 | 49.6 | 59.0 | 59.6 | 71.5 |
| 16 | 0.1 | 0.035 | 710 | 14.1 | 34.9 | 38.2 | 41.8 | 47.7 | 52.3 |
| 17 | 0.1 | 0.040 | 710 | 12.4 | 31.6 | 38.2 | 36.5 | 43.2 | 46.2 |
| 18 | 0.13 | 0.025 | 595 | 21.6 | 45.3 | 49.2 | 50.5 | 65.3 | 72.5 |
| 19 | 0.13 | 0.030 | 595 | 16.8 | 37.7 | 41.0 | 42.7 | 50.4 | 57.5 |
| 20 | 0.13 | 0.035 | 595 | 13.9 | 31.9 | 39.3 | 36.1 | 44.1 | 51.0 |
| 21 | 0.13 | 0.040 | 595 | 10.0 | 12.4 | 18.5 | 22.8 | 27.0 | 23.5 |

Figure 2:
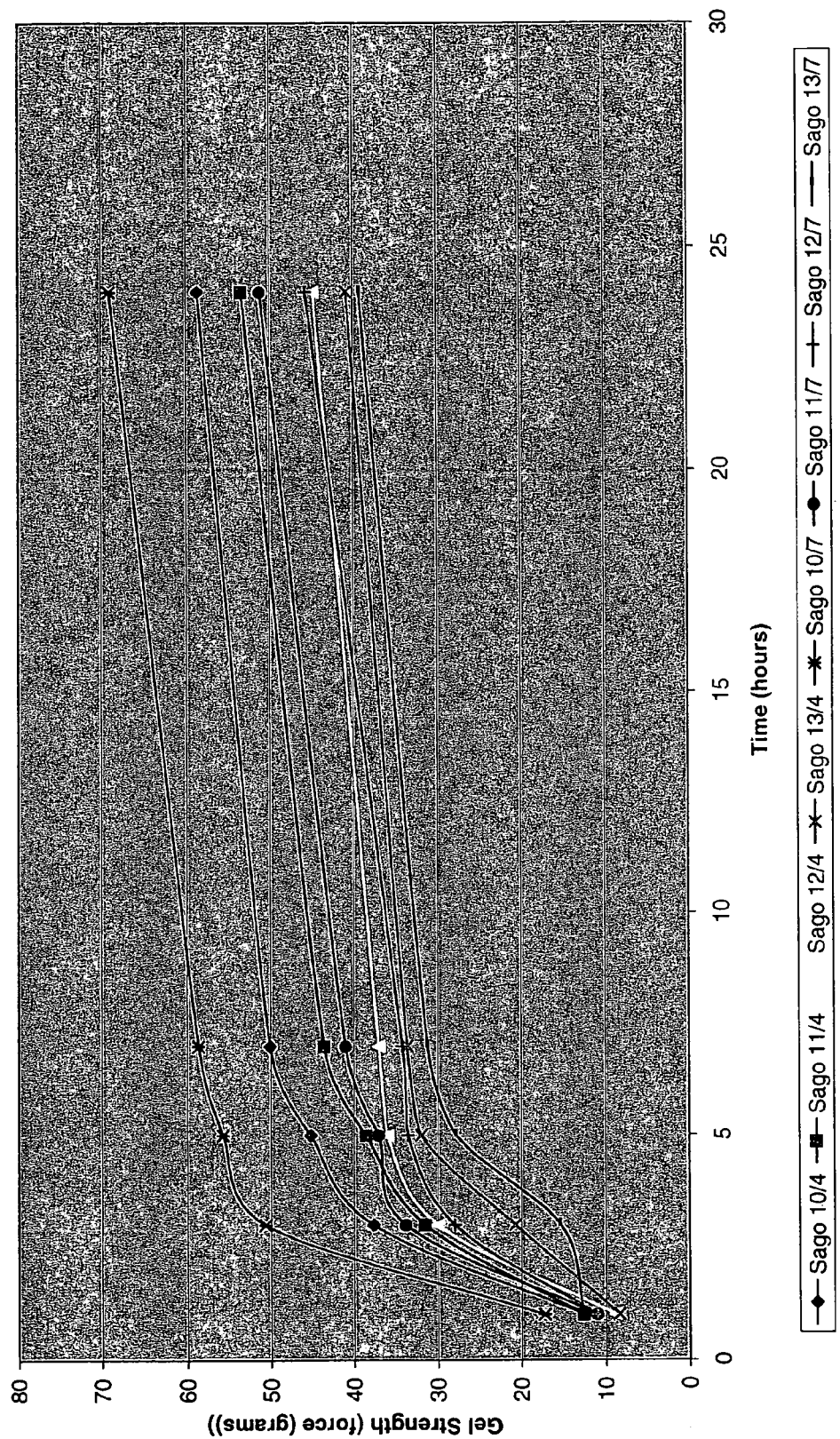
FIG. 2 is a graph illustrating the gel strength of various sago-based gels according to the present invention wherein the converted sago base has a viscosity of 825 Brabender Units.
Figure 3:
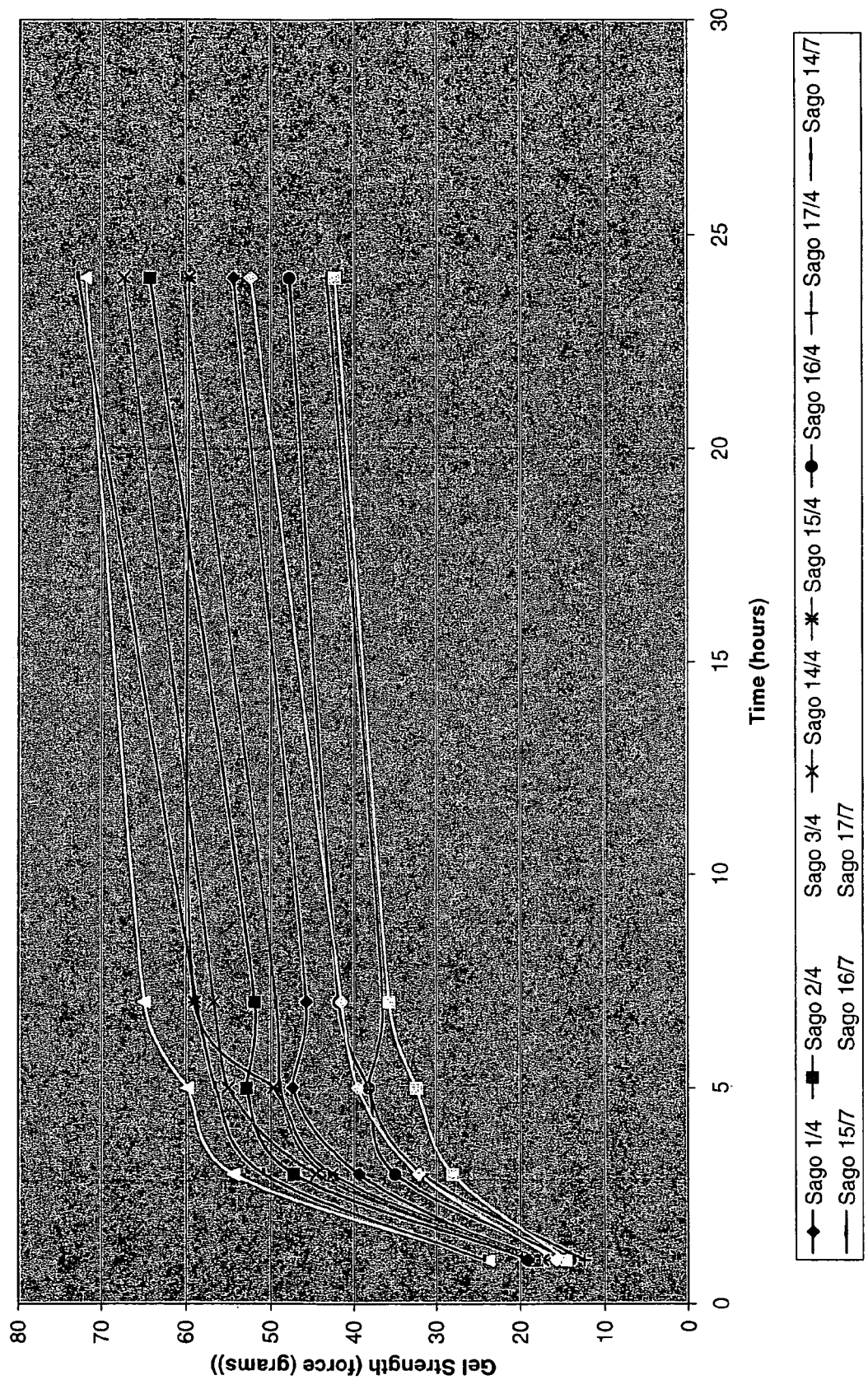
FIG. 3 is a graph illustrating the gel strength of various sago-based gels according to the present invention wherein the converted sago base has a viscosity of 710 Brabender Units.
Figure 4:
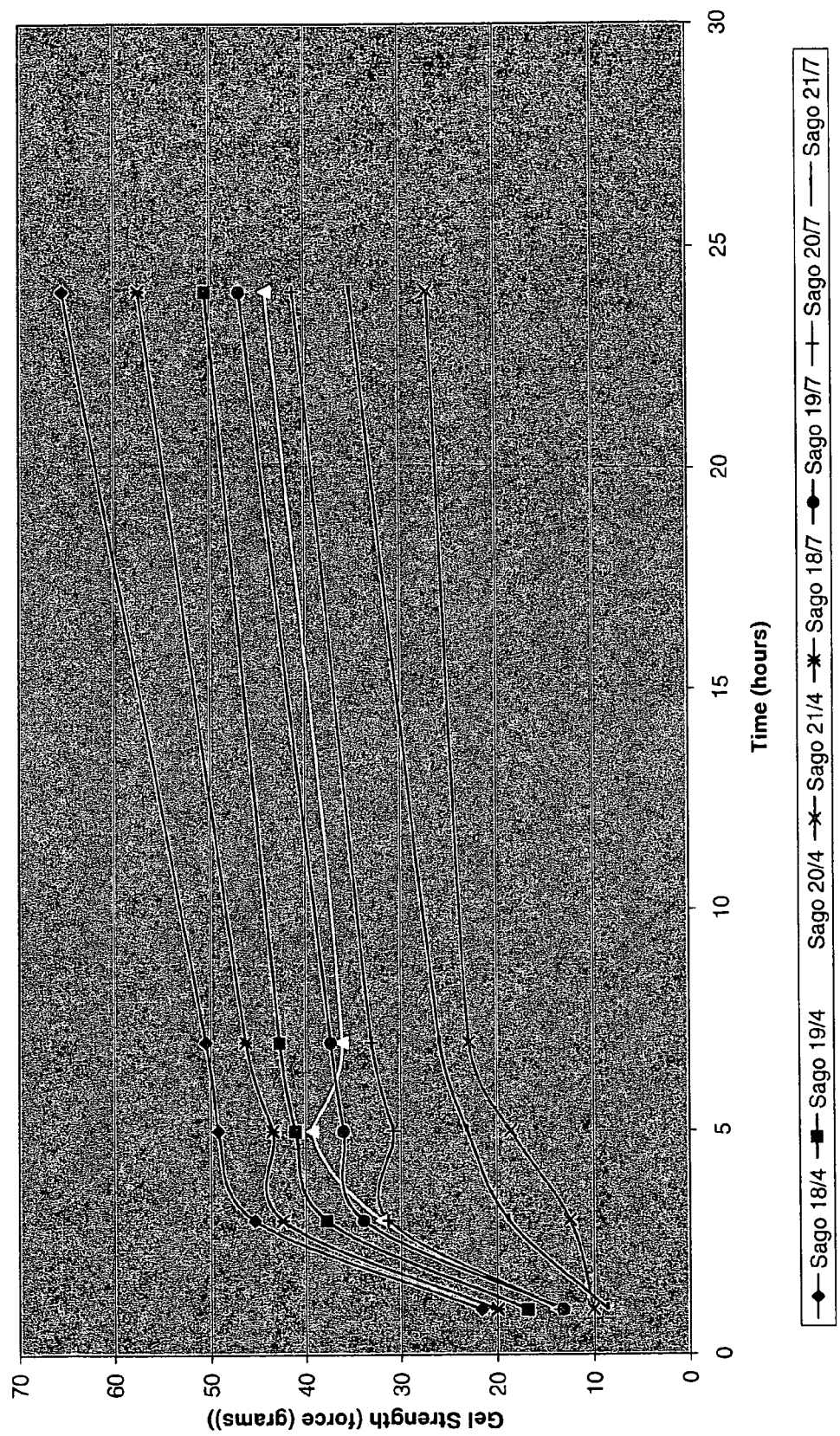
FIG. 4 is a graph illustrating the gel strength of various sago-based gels according to the present invention wherein the converted sago base has a viscosity of 595 Brabender Units.

FIGS. 2-4 graphically illustrate the gel strength of samples 1-3 and 10-21 above drum dried at a pH of 4 or pH of 7. As illustrated, gel strength decreases as the amount of crosslinking increases, regardless of pH. Further, FIG. 3 illustrates that there is a range in which the amount of crosslinking provides best performance. For example, while sago samples 1-3 all performed better than sago samples 16 and 17, the best performing sample was sago sample 14 drum dried at a neutral pH. Sample 14 had a higher degree of crosslinking than sago sample 1-3 but less crosslinking than sago samples 15-17.

Figure 5:
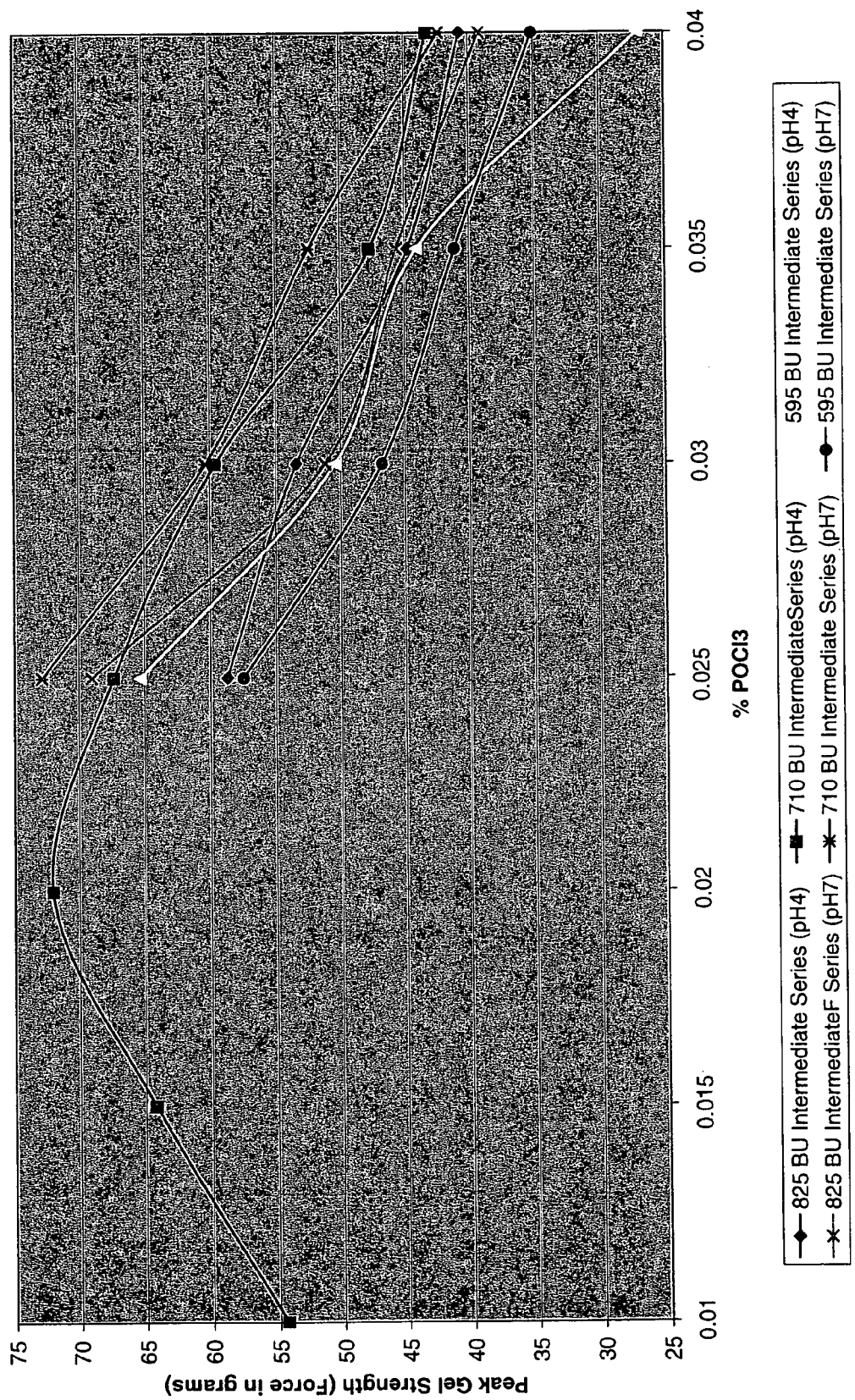
FIG. 5 is a graph illustrating the effect of crosslinking on peak viscosity of various sago-based gels according to the present invention.

FIG. 5 illustrates the effect of the amount of crosslinker used in preparing the instant gelling sago starches of the present invention on their peak viscosity.

FIG. 6 illustrates the gel strength of the five top performing sago starches of the present invention versus three non-sago controls. Control 1 is an alcohol-cooked cornstarch (commercially available as Mirage1™ from A. E. Staley Manufacturing Company, Decatur, Ill.). Control 2 is an instant gelling modified potato starch (commercially available as Paselli® Easy Gel from Avebe America, Inc., Princeton, N.J.). Control 3 is a thermally inhibited potato-based starch (commercially available as Novation® 6600 from National Starch and Chemical Company, Bridgewater, N.J.).

EXAMPLE IV

The effect of bleaching was evaluated in this example. Native sago starch was converted and crosslinked without the bleaching step given in Example 1.

A slurry was prepared by suspending 2000 g of sago starch in 3000 ml of tap water. The temperature of the slurry was adjusted to 42° C. in a hot water bath. The alkalinity was raised to between 28 and 32 ml 0.1N HCl (50-ml sample) by slowly adding a 3% aqueous NaOH solution. To this mixture, 5.0 g of a 2% aqueous solution of potassium permanganate was added (i.e., 0.005% based on weight of starch, corresponding to 17.5 ppm of manganese ions based on weight of starch). 1.4 g of 30% $H_2O_2$ was added to the starch slurry. This reaction was held for 3 hours until no hydrogen peroxide remained, as indicated by a negative test on an $H_2O_2$ quant strip. The resulting starch was found to have a Brabender viscosity of 775 BU.

The temperature of the starch slurry was then lowered to 30° C. and 0.025% $POCl_3$ (0.5 g) was added to the starch slurry and reacted for 0.5 hour to crosslink the starch. The pH of the starch slurry was then adjusted to 5.5 by addition of hydrochloric acid. The starch product was recovered by filtration, washed twice with water and air-dried.

This product was then drum-dried as in Example 3, giving gel strength of 41.05 after 5 hours storage at room temperature (when dispersed as taught for the lemon pie filling).

EXAMPLE V

This example illustrates the effect of reversing the order of the conversion and crosslinking reactions.

A slurry was prepared by suspending 2000 g of sago starch in 3000 ml of tap water. The temperature of this slurry was adjusted to 45° C. in a hot water bath. Hydrochloric acid was used to adjust the pH to 2.5 and 5 grams of sodium chlorite was added. After holding for two hours, the slurry was pH-adjusted to 4.0, with sufficient sodium metabisulfite added to neutralize any remaining oxidant. The slurry was then allowed to cool to near room temperature (about 25° to about 30° C.).

Alkalinity of the slurry was raised to between 28 and 32 ml 0.1N HCl (50-ml sample) by slowly adding a 3% aqueous NaOH solution. 0.5% NaCl (10 g) and 0.020% $POCl_3$ (0.4 g) were added to the starch slurry and allowed to react for 0.5 hour in order to crosslink the starch.

The temperature was adjusted to 42° C. using a hot water bath. 5.0 g of a 2% aqueous solution of potassium permanganate was added to this mixture (i.e., 0.005% based on weight of starch, corresponding to 17.5 ppm of manganese ions based on weight of starch). 2.0 g of 30% $H_2O_2$ was added to the starch slurry. This reaction was held for 3 hours until no hydrogen peroxide remained, as indicated by a negative test on an $H_2O_2$ quant strip.

The pH of the starch slurry was adjusted to 5.5 by neutralization with hydrochloric acid. The starch product was recovered by filtration, washed twice with water and air-dried.

The starch product was pregelatinized according to the procedure in Example 3, giving a gel strength of 24.5 compared to a gel strength of 54.9 for a product that was crosslinked after conversion after 5 hours storage at room temperature (when both were dispersed as shown above for the lemon pie filling).

EXAMPLE VI

Non-pregelatinized bases were evaluated for their gel strength when prepared according to the lemon pie filling gel evaluation. Since these were not pregelatinized, the formulations were cooked in a boiling water bath for 20 minutes, then allowed to cool in refrigerated conditions for seven hours. The results are summarized in Table 3 below, which show the non-drum-dried sample in comparison to the same base when drum dried.

TABLE 3

| SAMPLE | | % | % | BRABENDER VISCOSITY ANALYSIS | | | | | GEL STRENGTH |
|---|---|---|---|---|---|---|---|---|---|
| No. | | $H_2O_2$ | $POCl_3$ | Peak | 80° C. | 95° C. | 95° C. + 20' | BVD | 7 hr refrigerated |
| 22 | Drum dried | 0.055 | 0.017 | 875 | 870 | 860 | 820 | +1.16 | 70.4 |
| 23 | Non drum-dried | 0.055 | 0.017 | 875 | 870 | 860 | 820 | +1.16 | 194.95 |

EXAMPLE VII

This example illustrates the effect of spray drying bleached, converted, crosslinked sago starch.

A large batch of product was made according to the procedure taught in Example I. The product was then spray-dried pursuant to the process disclosed in U.S. Pat. Nos. 5,131,953 and 5,149,799. The following samples were then evaluated for their gel strength when prepared as given in the Lemon Pie Filling Gel Evaluation. The samples were held at room temperature for a period of seven hours, with their gel strength analyses listed below.

TABLE 4

| SAMPLE No. | | % $H_2O_2$ | % $POCl_3$ | SAMPLE GEL STRENGTH (GRAMS OF FORCE) 7 hr Refrigerated |
|---|---|---|---|---|
| 24 | SIDA[1] | 0.1 | 0.020 | Too weak to run. |
| 24 | EK[2] | 0.1 | 0.020 | Too weak to run. |

[1] SIDA is 'Steam Injection Dual Atomization', a process for preparing a cold water soluable starch as described in U.S. Pat. No. 5,149,799. According to the '799 patent, starch slurry is fed under pressure into an automizing nozzle. In this nozzle, the slurry is contacted with high pressure steam that simultaneously cooks and atomizes the starch granules into the drying chamber, where the granules are recovered.
[2] EK refers to that process described in U.S. Pat. No. 5,131,953 to Eden and Kasica ("EK"). In this process, a high temperature (300° F.+) jet cooked starch is atomized when spray-dried by using the pressure of the cook to atomize. In the EK process, the granular structure is not retained.

EXAMPLE VIII

This example illustrates the effect of drum drying bleached, converted, crosslinked sago starch.

A pilot scale drum drier (available from GMF-Gouda, Holland) was used to drum-dry a bleached, converted and crosslinked sago starch. This drum was 50 cm wide with a diameter of 50 cm and turned by a 5 HP variable speed motor. One reverse roll and three applicator rolls were arranged just above the drum.

The following eight batches of a bleached, converted and crosslinked sago starch were prepared

| Batch | % $H_2O_2$ | % $POCl_3$ |
|---|---|---|
| 1 | 0.05 | 0.025 |
| 2 | 0.06 | 0.020 |
| 3 | 0.06 | 0.015 |
| 4 | 0.06 | 0.010 |
| 5 | 0.06 | 0.015 |
| 6 | 0.055 | 0.0172 |
| 7 | 0.05 | 0.017 |
| 8 | 0.04 | 0.016 |

The modified sago starch was suspended in water to form a 21 Baume slurry, which was pH adjusted to approximately 6.5. The drum was started at 6 RPM and heated with steam at 120 PSIG to a surface temperature of approximately 160° C.

The slurry was pumped to the drum dryer by means of a moyno pump. The pump speed was adjusted to achieve a steady flow of slurry on to the second applicator roll. Once a coating was observed on the drum, a scraper knife was engaged by slowly tightening down on the knife bolts until a clean drum surface was noted.

The drum-dried starch film was then scraped into a conveying screw, which directed the scarped material into a waste hopper. Once a full sausage was obtained between the third and fourth applicator roll and the sheets were uniform, the product was collected into a container. This material was then ground in a hammer mill until a particle size of approximately 200 mesh (74 microns) was obtained.

These drum-dried starch products were evaluated as to their effectiveness in the acidic conditions of a lemon pie filling formulation as stated above. The viscosities of these pilot scale modified sago starches are shown below in Table 5. The resulting gel strengths are illustrated in Table 6.

TABLE 5

| | Intermediate Brabender Specs (Bleach + Conversion) | | | Final Product Brabender Specs (Bleach + Conversion + Crosslinked, Before Drum Drying) | | | | |
|---|---|---|---|---|---|---|---|---|
| Batch | Peak Visc. | 80° C. Visc | 95° C. Visc | Peak Visc | 80° C. Visc | 95° C. Visc | 95° C. + 20' | BVD |
| 1 | 870 | 840 | 670 | 730 | 650 | 730 | 785 | 12.31 |
| 2 | 710 | 665 | 510 | 505 | 485 | 505 | 495 | 4.12 |
| 3 | 705 | 655 | 490 | 910 | 880 | 780 | 720 | −11.36 |
| 4 | 565 | 520 | 360 | 800 | 750 | 580 | 500 | −22.67 |
| 5 | 770 | 710 | 520 | 970 | 960 | 880 | 820 | −8.33 |
| 6 | 850 | 795 | 605 | 875 | 870 | 860 | 820 | −1.15 |
| 7 | 840 | 790 | 630 | 755 | 720 | 755 | 760 | 4.86 |
| 8 | 935 | 900 | 750 | 1000 | 995 | 980 | 975 | −1.5 |

TABLE 6

| | Gel Strength Analysis (Lemon Pie Filling Formulation) | | | | | |
|---|---|---|---|---|---|---|
| Batch | 1 hour | 3 hour | 5 hour | 7 hour | 24 hour | Peak |
| 1 | 11.55 | 23.95 | 36.65 | 41.3 | 52.85 | 52.85 |
| 2 | 10.4 | 22 | 32.551 | 37.6 | 46.9 | 46.9 |
| 3 | 15.95 | 36 | 40.6 | 44 | 48.2 | 48.2 |
| 4 | 10.45 | 18.65 | 19.8 | 22.6 | 26.4 | 26.4 |
| 5 | 12.65 | 34.85 | 46.15 | 49.4 | 57.15 | 57.15 |
| 6 | 12.9 | 45.2 | 53.2 | 56.2 | 68.8 | 68.8 |
| 7 | 15.05 | 32.1 | 35.4 | 40.7 | 54 | 54 |
| 8 | 12.6 | 28.35 | 42.1 | 49.8 | 61.2 | 61.2 |

It is known in the art that one may adjust the variables of slurry concentration, drum temperature, drum speed, pH and type of starch in order to create products with different degrees of cook. In general, low degrees of cook may be obtained by adjusting the slurry to a relatively neutral pH (between pH 5 and 8) and high concentration, increasing the drum speed, and lowering the drum temperature. At the other extreme, adjusting the slurry to low or very high pH and low concentration, lowering the drum speed and increasing the drum temperature may produce a high degree of cook. Intermediate degrees of cook may be obtained by adjusting the pertinent variables accordingly.

EXAMPLE IX

This example compares the starch of the present invention with the starch of U.S. Pat. No. 6,447,615 ("the '615 patent").

Two sets of two different lemon pie fillings were prepared for a total of eight pie fillings. In the first set, lemon pie fillings were prepared according to the 'Lemon Pie Filling Gel Evaluation' above twice with the starch of the present invention, and twice with the starch of the '615 patent for four 6% starch lemon pie fillings. In the second set, four more sets were prepared, except that 10% starch was used instead of 6%. These 10% fillings were prepared as follows. A total of 10.0 g of starch, 24.6 g sugar, 0.62 g dextrose, 0.19 g sodium citrate and 0.19 g citric acid are dry-mixed by shaking in a 4-oz. (118-ml) jar. This dry mixture is slowly added to a solution of 51.5 g distilled water and 12.91 g lemon juice over the course of one minute and mixed in a Sunbeam® Mixmaster® Kitchen Master at speed #1 for a period of 4 minutes. The resulting mixture is then poured into 4-oz (118-ml) jars, allowing for a headspace of approximately 5 mm and held at room temperature for various periods of time.

Gel strength tests were performed on each of the eight lemon pie fillings according to the procedure described above in the 'Gel Strength Measurement' section. The results of those tests, taken at 5 hours and 24 hours, were as follows

TABLE 7

| Lemon Pie Filling Batch | Gel Strength (Force in grams) | | Percent |
| --- | --- | --- | --- |
| | 5 hour | 24 hour | Gelled* |
| 6% '615 Starch 1 | 26.3 | 41.6 | |
| 6% '615 Starch 2 | 27.4 | 39.2 | |
| 6% '615 Starch Average | 26.85 | 40.4 | 66 |
| 6% Present Starch 1 | 47.3 | 57.8 | |
| 6% Present Starch 2 | 48.8 | 59.7 | |
| 6% Present Starch Average | 48.05 | 58.75 | 82 |
| 10% '615 Starch 1 | 360.7 | 469.4 | |
| 10% '615 Starch 2 | 375.1 | 445.5 | |
| 10% '615 Starch Average | 367.9 | 457.45 | 80 |
| 10% Present Starch 1 | 133.5 | 133.8 | |
| 10% Present Starch 2 | 131.7 | 134.4 | |
| 10% Present Starch Average | 132.6 | 134.1 | 99 |

*The 'Percent Gelled' is the percent gelled at based on gel strength at 5 hours versus the gel strength at 24 hours, where the gel at 24 hours is considered to be gel strength at 100% gelled.

As can be seen from Table 7, the sago starch of the present invention gels faster than the sago starch of the '615 patent, both at high (10%-99% gelled versus 80%) and low (6%-82% gelled versus 66%) starch solids. Accordingly, the sago starch of the present invention is more efficient at forming stronger gels faster with a smaller amount of starch solid. Further, the lemon pie fillings of the present invention exhibited no syneresis and were dry on top to touch. In contrast, the lemon pie fillings formed using the sago starch of the '615 patent exhibited severe syneresis and were not able to sequester water like the lemon pie fillings formed using the sago starch of the present invention. The sago starch of the present invention has application in food products such as pie fillings and cookie spreads, whereas the sago starch of the '615 patent has application in confectionery food products such as gumdrops (e.g., Mason Dots®).

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed and desired to be secured by Letters Patent is:

1. A cold water dispersible, modified sago starch with gelling properties prepared by pregelatinizing a sago starch that has been converted to a peak viscosity of about 400 Brabender Units to about 1000 Brabender Units and inhibited, the converted, inhibited starch having a Brabender Viscosity Differential ("BVD"), measured between about 80° and about 90° C., of from about −35 BVD to about 25 BVD, wherein the converted, inhibited, pregelatinized sago starch is capable of forming a gel having a gel strength of at least 30 grams within 5 hours from preparation; and
 wherein the Brabender viscosity is measured by rapidly heated to 50° C. and then heated further from 50° to 95° C. at a heating rate of 1.5° C. per minute.

2. The modified sago starch of claim 1 wherein the sago starch is thermally inhibited.

3. The modified sago starch of claim 1 wherein the sago starch is inhibited by reacting the starch with at least 0.005% by weight of a crosslinking agent.

4. The modified sago starch of claim 3 wherein the sago starch is reacted with at least about 0.015% of a crosslinking agent.

5. The modified sago starch of claim 4 wherein the sago starch is reacted with about 0.015% to about 0.030% of a crosslinking agent.

6. The modified sago starch of claim 3 wherein the sago starch is reacted with a crosslinking agent selected from the group consisting of phosphorus oxychloride, epichlorohydrin, sodium trimetaphosphare and adipic-acetic anhydride.

7. The modified sago starch of claim 6 wherein the crosslinking agent is phosphorus oxychloride.

8. The modified sago starch of claim 1 wherein the starch is capable of forming a gel having a gel strength of at least 30 grams within 5 hours from preparation.

9. A food system comprising the modified sago starch of claim 1.

10. A process for preparing a cold water dispersible, modified sago starch having gelling properties, the process comprising the steps of:
 converting a sago starch to a peak viscosity of about 400 Brabender Units ("BU") to about 1000 BU, wherein the Brabender viscosity is measured by rapidly heated to 50° C. and then heated further from 50° to 95° C. at a heating rate of 1.5° C. per minute;
 inhibiting the converted sago starch such that the inhibited starch has a Brabender Viscosity Differential ("BVD"), measured between about 80° and about 90° C., of from about −35 BVD to about 25 BVD, measured at 7% solids; and
 pregelatinizing the converted inhibited sago starch;
 wherein the converted, inhibited, pregelatinized sago starch is capable of forming a gel having a gel strength of at least 30 grams within 5 hours from preparation.

11. The process of claim 10 wherein the sago starch is thermally inhibited.

12. The process of claim 10 further comprising the step of grinding the modified sago starch to a powder.

13. The process of claim 12 wherein the powder is ground so that at least about 85% of the starch passes through a 200-mesh screen.

14. The process of claim 10 wherein the sago starch is pregelatinized by drum drying the starch.

15. The process of claim 10 wherein the sago starch is inhibited by reacting the sago starch with at least 0.005% by weight of a crosslinking agent.

16. The process of claim 15 wherein the sago starch is reacted with at least about 0.015% by weight of a crosslinking agent.

17. The process of claim 16 wherein the sago starch is reacted with between about 0.015% and about 0.030% by weight of a crosslinking agent.

18. The process of claim 15 wherein the crosslinking agent is selected from the group consisting of phosphorus oxychloride, epichlorohydrin, sodium trimetaphosphate and adipic-acetic anhydride.

19. The process of claim 18 wherein the crosslinking agent is phosphorus oxychloride.

20. The process of claim 15 wherein the crosslinking reaction is further carried out at a temperature of about 5° C. to about 60° C.

21. The process of claim 20 wherein the crosslinking reaction is further carried out at a temperature of about 20° C. to about 45° C.

22. The process of claim 9 wherein the sago starch is converted with hydrogen peroxide.

23. The process of claim 9 further comprising the step of bleaching the sago starch.

* * * * *